United States Patent
Butzmann

(10) Patent No.: US 10,193,356 B2
(45) Date of Patent: Jan. 29, 2019

(54) ELECTROCHEMICAL ENERGY ACCUMULATOR AND BALANCING METHOD

(71) Applicant: Robert Bosch GmbH, Stuttgart (DE)

(72) Inventor: Stefan Butzmann, Schalksmühle (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 15/110,484

(22) PCT Filed: Dec. 30, 2014

(86) PCT No.: PCT/EP2014/079449
§ 371 (c)(1),
(2) Date: Jul. 8, 2016

(87) PCT Pub. No.: WO2015/104205
PCT Pub. Date: Jul. 16, 2015

(65) Prior Publication Data
US 2016/0329725 A1  Nov. 10, 2016

(30) Foreign Application Priority Data
Jan. 10, 2014  (DE) ........................ 10 2014 200 329

(51) Int. Cl.
*H02J 7/00* (2006.01)
*B60L 11/18* (2006.01)
*H01M 10/42* (2006.01)

(52) U.S. Cl.
CPC ......... *H02J 7/0016* (2013.01); *B60L 11/1853* (2013.01); *B60L 11/1861* (2013.01);
(Continued)

(58) Field of Classification Search
USPC ................................ 320/107, 118, 122, 134
See application file for complete search history.

(56) References Cited

U.S. PATENT DOCUMENTS

| | | | |
|---|---|---|---|
| 7,567,060 B1 * | 7/2009 | Atcitty | G01R 31/40 307/64 |
| 2003/0152830 A1 * | 8/2003 | Eaves | H01M 10/425 429/156 |

(Continued)

FOREIGN PATENT DOCUMENTS

| CN | 102496970 | 6/2012 |
|---|---|---|
| CN | 102570489 A | 7/2012 |

(Continued)

OTHER PUBLICATIONS

International Search Report for Application No. PCT/EP2014/079449 dated Mar. 26, 2015 (English Translation, 3 pages).

*Primary Examiner* — Brian Ngo
(74) *Attorney, Agent, or Firm* — Michael Best & Friedrich LLP

(57) ABSTRACT

An electrochemical energy accumulator (100) and a method for balancing a multiplicity of sections (S1, S2, S3) of electrochemical accumulator modules (10) connected in parallel with one another by means of at least one UniBB module are proposed. In this context, the following steps are carried out: detecting (S100) a first state of charge (I) of a first accumulator module (M1), detecting (S200) a second state of charge (II) of a second accumulator module (M2), wherein the second accumulator module (M2) is a UniBB module, and operating (S300) the second accumulator module (M2) as a power source in order to adapt the first stage of charge (I) and the second state of charge (II) to one another.

10 Claims, 7 Drawing Sheets

(52) U.S. Cl.
CPC ........... *B60L 11/1866* (2013.01); *H02J 7/007* (2013.01); *H02J 7/0014* (2013.01); *H01M 10/425* (2013.01); *H01M 2010/4271* (2013.01); *H01M 2220/20* (2013.01); *Y02T 10/7005* (2013.01); *Y02T 10/7044* (2013.01); *Y02T 10/7055* (2013.01); *Y02T 10/7061* (2013.01)

(56) References Cited

U.S. PATENT DOCUMENTS

| | | | | |
|---|---|---|---|---|
| 2004/0135546 | A1* | 7/2004 | Chertok | B60L 11/185 320/118 |
| 2006/0076923 | A1* | 4/2006 | Eaves | G01T 1/2018 320/112 |
| 2007/0105010 | A1* | 5/2007 | Cassidy | A61M 5/44 429/90 |
| 2008/0211459 | A1 | 9/2008 | Choi | |
| 2009/0208824 | A1 | 8/2009 | Greening et al. | |
| 2011/0025258 | A1 | 2/2011 | Kim et al. | |
| 2011/0298626 | A1* | 12/2011 | Fechalos | H01M 10/482 340/664 |
| 2012/0319657 | A1* | 12/2012 | Ke | H02J 7/0021 320/134 |
| 2013/0257377 | A1* | 10/2013 | Diamond | G01R 31/362 320/118 |
| 2013/0260196 | A1* | 10/2013 | Takahashi | H01M 10/425 429/90 |
| 2013/0300369 | A1 | 11/2013 | Butzmann | |
| 2013/0320772 | A1* | 12/2013 | Qiao | H01M 10/04 307/87 |
| 2014/0015488 | A1* | 1/2014 | Despesse | H01M 10/425 320/122 |
| 2017/0141586 | A1* | 5/2017 | Pernyeszi | H02J 7/007 |

FOREIGN PATENT DOCUMENTS

| | | |
|---|---|---|
| CN | 102832657 A | 12/2012 |
| DE | 102012207671 | 11/2013 |
| JP | 2000116014 A | 4/2000 |
| JP | 2008029050 A | 2/2008 |
| JP | 2010141970 A | 6/2010 |
| WO | 2011158086 A2 | 12/2011 |
| WO | 2013140894 A1 | 9/2013 |

* cited by examiner

ELECTROCHEMICAL ENERGY ACCUMULATOR AND BALANCING METHOD

BACKGROUND OF THE INVENTION

The present invention relates to an electrochemical energy store and to a method for balancing a multiplicity of strings of electrochemical storage modules of an electrochemical energy store connected in parallel with one another. Electrochemical energy stores consist of individual structural units ("modules") in order to be able to provide the high currents which are required for some applications and which can no longer be provided by a single module. For said application it is necessary to connect modules in parallel. This is in turn not readily possible with standard modules since compensation currents that can lead to undesired operating states can flow between the modules. The modules of present rechargeable battery cells typically contain fluids based on lithium chemistry. These cells are sensitive both to overcharging and to deep discharge. An overcharging above approximately 4.2 V per cell or module results in exothermic processes that can lead to the destruction of the cell. A deep discharge below approximately 2.5 V per cell or module leads to permanent degradation of the energy storage and current carrying capacity of the cell. If cells are connected in series, then they are charged and discharged only jointly. In other words, the charge changes of each cell of the string are identical. Differences in the cell constitution then have the effect that the state of charge (SOC) of the cells is no longer identical with increasing use. This may have the effect that during charging individual cells may be overcharged, while other cells are not yet fully charged. The latter alternative entails the risk that during discharging individual cells may be subjected to deep discharge, even though other cells are not yet fully discharged. For this reason, the state of the rechargeable battery cells is monitored permanently and charging or discharging is possibly prevented. A process of charge equalization—also referred to as "balancing"—between the cells of a rechargeable battery pack ("electrochemical energy store") pursues the aim of all the cells having the same SOC. The balancing of the cells within a module is ensured by an integrated measuring and balancing circuit designed for this purpose.

Moreover, the prior art discloses so-called UniBB (universal buck-boost) modules comprising an electrochemical energy store (e.g. lithium ion based or lithium polymer based) and an electrical circuit by means of which they can realize different terminal characteristics. By way of example, a UniBB module can be used both as voltage source and as current source. The electrical circuit within the UniBB module could also be referred to as "coupling unit" which contains an inductance. The construction and the functioning of a UniBB module is known for example from the prior art.

CN 102496970 discloses a balancing system for an electrochemical energy store of an electrically operated means of locomotion. The electrochemical energy store contains two storage strings connected in parallel with one another. Each of the storage strings contains individual storage cells. Via a resistance and a capacitance, an SOC value of the storage strings is determined and energy of individual cells is shifted to other cells having a lower SOC.

US 2011/025258 discloses an interconnected system of electrochemical storage cells in which balancing is carried out whilst avoiding overcharging or deep discharge of the cells. The document discloses a control unit that monitors the SOC of the cells and groups the cells into dischargeable and chargeable cells on the basis of their SOC. Depending on their group association the cells are charged either individually or jointly.

US 2009/208824 discloses an interconnected system of electrochemical storage cells which are connected in parallel with one another. The cells have a respective controller, which can be configured as a buck-boost controller. If it is recognized that the cells have different states of charge, the energy drawn from the individual cells is varied. This prevents different cells from having different states of charge for a long period of time.

It is an object of the present invention to improve balancing of electrochemical stores connected in parallel.

SUMMARY OF THE INVENTION

The abovementioned object is achieved according to the invention by means of an electrochemical energy store and a method for balancing a multiplicity of strings of electrochemical storage modules connected in parallel with one another by means of at least one UniBB module. The method comprises identifying a first state of charge of a first storage module. In addition, the state of charge of a second storage module is identified. The first and second storage modules are arranged in different strings. The second storage module is configured as a UniBB module and is operated as a current source in order to adapt the first state of charge and the second state of charge to one another. By virtue of the fact that the UniBB module is operated as a current source, charge can be shifted between the first storage module and the second storage module in a controlled manner, without impermissibly high compensation currents flowing on account of great differences in the state of charge and/or great differences in the terminal voltage.

Preferably, the first storage module is also a UniBB module and is operated as a voltage source during the balancing described above. In particular, all further storage modules within the electrochemical energy store are also configured as UniBB modules. In this case, all storage modules with the exception of the second storage module are operated as a voltage source. In this way, it is possible to control the balancing according to the invention according to each of the storage modules as a current source.

Preferably, the second state of charge is lower than the first state of charge. In other words, that storage module having the lower state of charge is switched as a current source. The latter then controls a current flow by means of which its own SOC is raised. Alternatively, the first state of charge may also be higher, such that the first storage module is switched as a current source and increases its own SOC. It goes without saying that it is also possible to operate the respective storage module in the current source mode in such a way that the storage module in the current source mode decreases its own SOC.

By way of example, the first storage module may be operated in a first operating mode from the group "regulated", "unregulated", "buck" or "boost". Correspondingly, the second storage module which is arranged in a different string than the first storage module, is operated in a second operating mode of the same group, wherein the second operating mode is preferably not identical to the first operating mode. This configuration avoids impermissible operating states and in particular also an increased energy expenditure and wear during balancing.

With further preference, the first storage module may be operated unregulated and the second storage module may be operated in the boost current source operating mode. Alternatively, the first storage module may be operated in the buck charging mode and the second storage module may be operated in the current source mode. This configuration constitutes a preferred and particularly advantageous combination of two operating states in different strings of arranged storage modules.

With further preference, the multiplicity of storage modules within the electrochemical energy store comprises further electrochemical storage modules. The latter are put into a blocking mode if they belong to strings not involved in the balancing, and are put into a bypass mode if they belong to strings involved in the balancing. In this case, the blocking mode constitutes an interruption of the electric circuit, while the bypass mode corresponds to an external short circuit of the respective storage module, such that a current flow can take place past the latter without being impeded. A simple and efficient selection of the strings participating in the balancing is possible in this way.

If only one storage module is contained per string, a storage module having a highest state of charge may be operated as a voltage source and the other electrochemical storage modules not put into a blocking mode may be operated in a current source mode. However, if more than one storage module is contained per string (in other words if series-connected storage modules are present within the electrochemical energy store) a storage module having a highest state of charge is operated in a current source mode and the other electrochemical storage modules not put in a blocking mode or bypass mode are operated in a voltage source mode. In this way, the balancing can be performed with the least possible electrical loss.

With further preference, a charging current impressed into the multiplicity of electrochemical storage modules is controlled depending on a respective state of charge of the storage modules. The charging current is preferably controlled in such a way that a predefined, in particular complete state of charge of the storage modules is substantially attained at an identical point in time. In this way, the charging process can be effected in a time-optimized manner and the power loss can be reduced further.

With further preference, electrochemical storage modules within the electrochemical energy store are put in a blocking mode as soon as they have attained a predefined maximum voltage. This is carried out in particular in such a case in which the electrochemical storage module is the only storage module in its string. If a second module has to be charged in the string while a first storage module has attained its predefined maximum voltage, the fully charged electrochemical storage module is to be put into a bypass mode in order still to enable a charging process of the remaining storage module. It is only if the last storage module within a respective string has attained its maximum voltage that at least one of the storage modules enters a blocking mode in order not to produce any unnecessary electrical losses during the further balancing process for remaining strings.

It goes without saying that balancing may also be performed during the operation of the multiplicity of electrochemical storage modules of an electrochemical energy store. For this purpose, the strings, depending on a respective average state of charge, are involved in a total current to be supplied in order to assume a substantially identical state of charge. A string-by-string control of the discharge current may constitute a variant of the balancing according to the invention with particular reduction of losses, since, for the balancing, all modules take up energy (charging process) or emit energy (discharging process), without charge being shifted solely for balancing purposes.

A second aspect of the present invention proposes an electrochemical energy store comprising a multiplicity of strings of electrochemical storage modules connected in parallel with one another, and a processing unit for carrying out a method in accordance with the first-mentioned aspect of the invention. In this case, each string may comprise a single electrochemical storage module or a multiplicity of electrochemical storage modules connected in series. The storage modules may all be configured as a UniBB module according to the first-mentioned aspect of the invention, the mode of operation being controlled or co-ordinated by the superordinate processing unit. In an alternative configuration, the processing unit is contained in an electrochemical storage module which (at times) performs a master function by carrying out or coordinating the method in accordance with the first-mentioned aspect of the invention. In principle, each storage module may comprise a processing unit, as a result of which it is designed for performing the master function mentioned above. The functioning of the electrochemical energy store according to the invention is evident according to that of the first-mentioned aspect of the invention, and so, for description of the features, feature combinations and advantages, reference is made to the above explanations in order to avoid repetitions.

BRIEF DESCRIPTION OF THE DRAWINGS

Exemplary embodiments of the invention are described in detail below with reference to the accompanying drawings. In the drawings.

DETAILED DESCRIPTION

Figure 1:
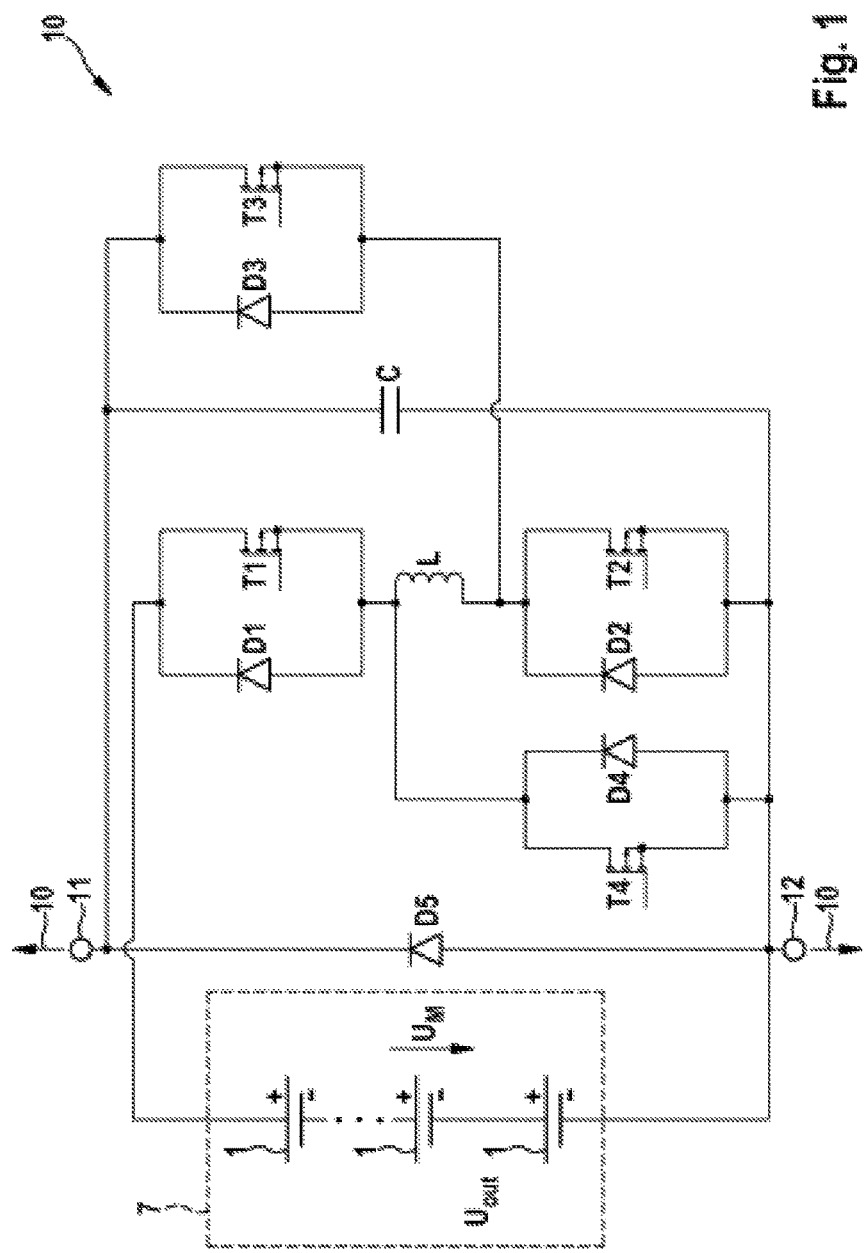
FIG. 1 shows a circuit diagram of one exemplary embodiment of a UniBB module that is useable according to the invention.

FIG. 1 shows the circuit diagram of one exemplary embodiment of a UniBB module 10. Via a first terminal 11 and a second terminal 12 the UniBB module 10 is designed to be interconnected with further UniBB modules to form a string. Four semiconductor switches T1, T2, T3, T4, which are preferably configured as MOSFETs or IGBTs, with associated freewheeling diodes D1, D2, D3, D4 are arranged between the first terminal 11 and the second terminal 12. The semiconductor switches T1 to T4 may be combined with the respective freewheeling diodes D1 to D4 as electrical two-terminal networks ZP1 to ZP4. In this case, a first terminal of the first two-terminal network ZP1 is connected to a positive terminal of the energy store 7. A second terminal of the first two-terminal network ZP1 is connected firstly to a first terminal of the fourth two-terminal network ZP4 and then secondly via an inductance L to a first terminal of the second two-terminal network ZP2 and also a second terminal of the third two-terminal network ZP3. A first terminal of the third two-terminal network ZP3 is connected to the first terminal 11 of the UniBB module 10. A first terminal of a capacitance C is also connected to the first terminal 11, the second terminal of said capacitance being connected to the second terminal 12 of the UniBB module 10. The second terminals of the second two-terminal network ZP2 and of the fourth two-terminal network ZP4, respectively, are connected firstly to the second terminal 12 of the UniBB module 10 and secondly to a second terminal of the electrical energy store 7. The energy store 7 supplies a module voltage $U_M$. The UniBB module 10 illustrated has a positive pole (plus pole) at the first terminal 11 and a negative pole (minus pole) at the second terminal 12. Control lines for driving the semiconductor switches T1 to T4 are not illustrated for the sake of clarity. The same applies to current sensors. The electrical energy store 7 may consist of one or a plurality of electrochemical cells 1 or other electrical energy storage units, which in this case jointly provide the module voltage $U_M$. The UniBB module 10 may assume a plurality of different operating states, depending on how the semiconductor switches T1 to T4 are actuated. In particular, a bypass, a voltage source in the buck or boost mode, a current source in the buck or boost mode, a charging circuit and a blocking may be realized. For details, reference is made to the prior art.

Figure 2:
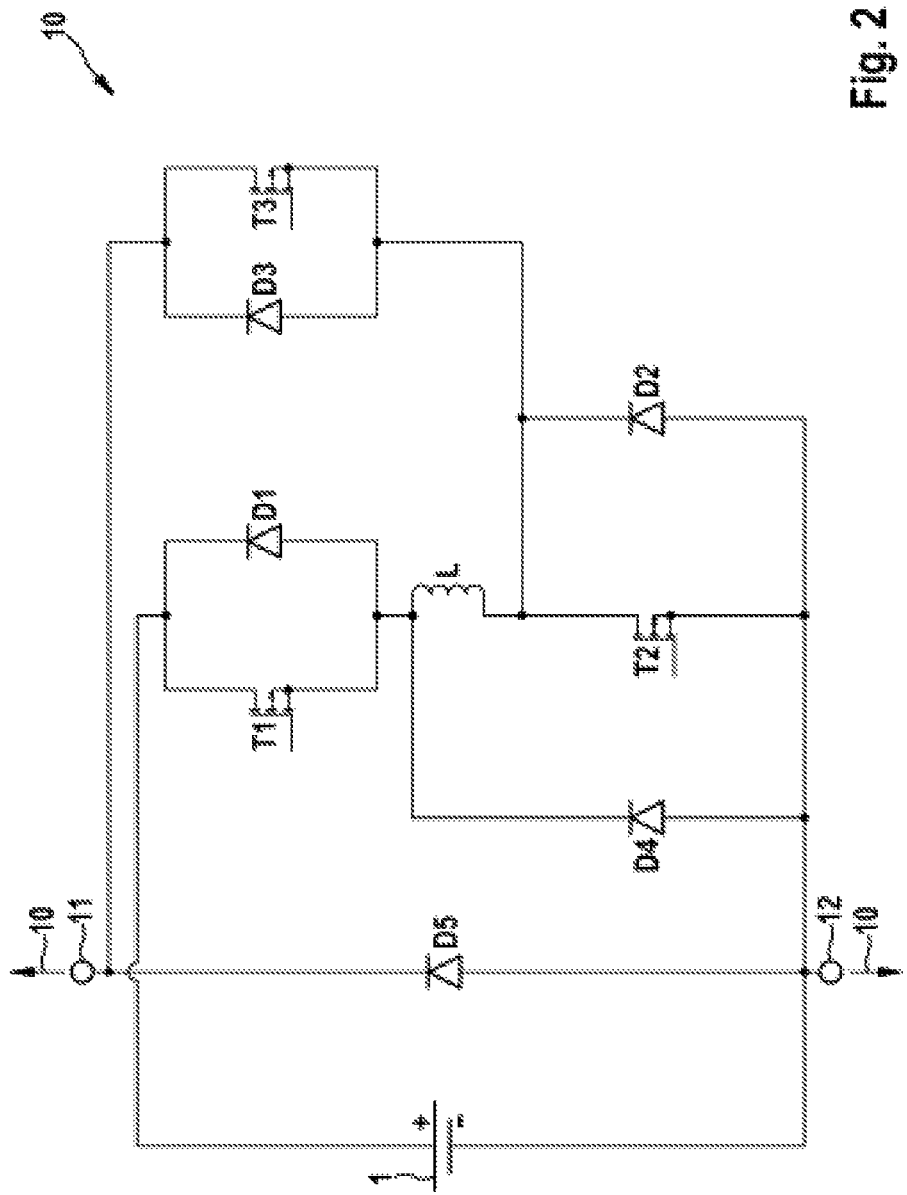
FIG. 2 shows a circuit diagram of an alternative exemplary embodiment of a UniBB module that is useable according to the invention.

FIG. 2 shows a circuit diagram of an alternative UniBB module 10 to the UniBB module 10 illustrated in FIG. 1. Compared with the arrangement illustrated in FIG. 1, the capacitance C and transistor T4 (but not the diode D4 thereof) are omitted. Moreover, only a single storage cell 1 is contained for the sake of clarity.

Figure 3:
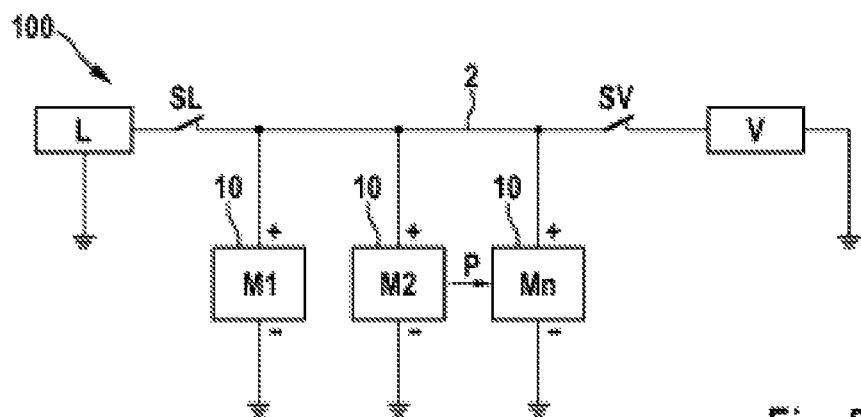
FIG. 3 shows a schematic circuit diagram regarding the parallel operation of three electrochemical storage modules.

FIG. 3 shows a circuit diagram of an arrangement 100 in which parallel-connected storage modules 10 (individually identified by M1, M2 and Mn) are arranged between a charger L and a load V. The charger L is connectable to the parallel circuit of the modules 10 via a charging contactor SL, and the load V is connectable to the parallel circuit of the modules 10 via a load contactor SV. An arrow P is used to indicate that further modules 10 could be supplementarily connected. The modules 10 are connected by their negative terminal in the direction of an electrical ground and by their positive terminal to a common busbar 2. The different switching states will be discussed in greater detail in association with the subsequent figures.

Figure 4:
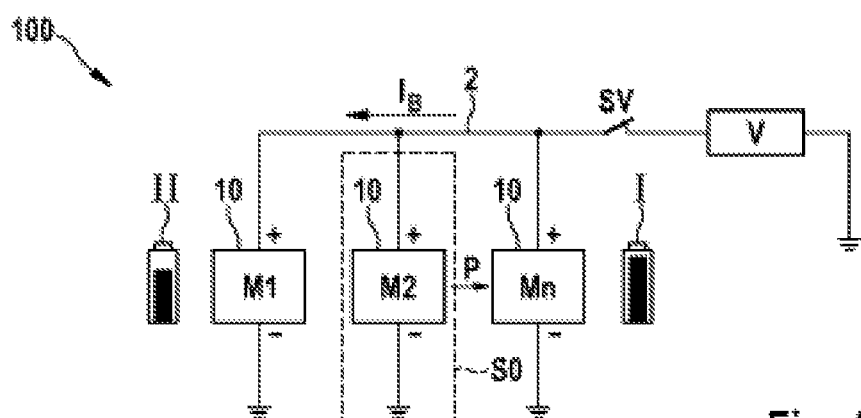
FIG. 4 shows a schematic circuit diagram regarding the discharge of electrochemical storage modules connected in parallel.

FIG. 4 shows the circuit 100 illustrated in FIG. 3 in a state in which the charger L, on account of an opened charging contactor SL, has no effect on the functioning and is therefore not illustrated. The load V is not connected to the modules 10 either, since the load contactor SV has been opened. The arrangement illustrated represents for example a case in which an electrically drivable vehicle is not connected to a charging station and is at a standstill. While the module Mn has a full state of charge SOC I, the module M1 has a second state of charge SOC II that is lower than the state of charge I. A balancing between the modules M1, Mn takes place by means of the current $I_B$. For this purpose, either the module M1 may be operated as a voltage source and the module Mn as a current source, or vice versa. In both configurations, a plurality of combinations of operating states from the group "regulated", "unregulated", "boost", "buck" are possible. By way of example, when the module M1 is operated as a voltage source and the module Mn as a current source, the module M1 may be unregulated. The module Mn must then operate in the boost current source mode since its voltage must indeed be higher than the terminal voltage of the module M1. Alternatively, it is possible for the module M1 to operate in the buck charging mode (wherein the voltage present is lower than the terminal voltage of the module Mn). In this case, the module Mn is operated in the current source mode. The method that generates the least loss will be used in practice. The corresponding considerations are familiar to the person skilled in the art for voltage converters, for which reason reference is made to the relevant technical literature for further considerations. The module M2 forms a string S0 not involved in the balancing method. It is put into a blocking mode in which a current flow through the string S0 cannot take place. In other words, an electrical connection between ground and the busbar 2 is interrupted within the string S0. If more than two modules, for example three or more modules, are intended to interact during the balancing, then it is assumed that the module having the highest SOC (for example the module Mn) operates as a voltage source and the modules to be charged (the modules M1, M2) operate in the current source mode. An internal balancing within a module generally takes place by means of the resistive method. That means that the state of charge of cells 1 having a high SOC is brought to the state of cells 1 having a lower SOC by resistive loading. This process takes place periodically as soon as the vehicle is at a standstill or the load V is disconnected from the modules 10 by means of the load contactor SV. Consequently, the SOC of modules 10 also varies over time even if they are not included in the balancing method described above. An iterative module balancing taking account of all modules 10 in the manner described above is necessary for this reason.

Figure 5:
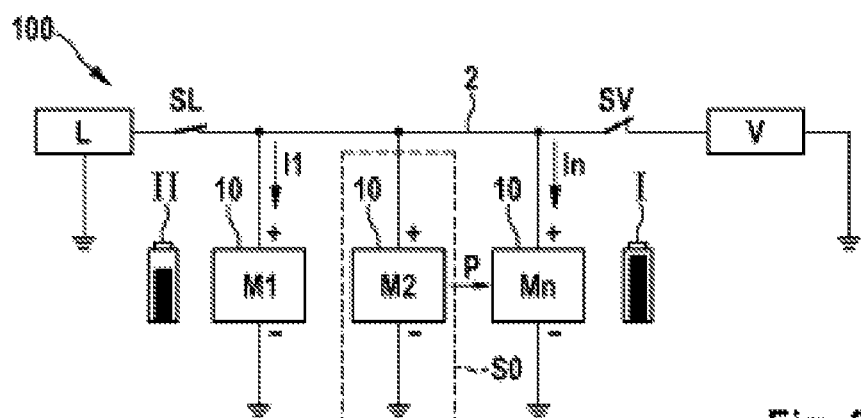
FIG. 5 shows a schematic circuit diagram regarding the balancing of electrochemical storage modules connected in parallel.

FIG. 5 shows the circuit 100 illustrated in FIG. 3 in an operating state of a balancing during charging. In the example illustrated, the module M1 is again assumed to have a lower SOC II than the module Mn (which has a higher SOC I). The charger L is assumed to act as a voltage source since the charging current regulation of the modules 10 is controlled such that the charging current I1 into the module M1 is somewhat higher than the charging current In into the module Mn. By means of suitable setting of the charging currents I1, In, both modules 10 are fully charged in the same time. This principle can be generalized to all modules 10. Modules 10 having a lower SOC are charged to a greater extent than those having a higher SOC. Modules in which the storage cell 1 (e.g. a rechargeable battery) has attained the maximum voltage are put into the blocking mode. If appropriate, internal (resistive) balancing then begins after the end of which the module 10 as a whole can again enter the charging mode in order to maximize its SOC. For the sake of simplicity, the load contactor SV has been opened, such that the circuit 100 is in a pure charging state.

Figure 6:
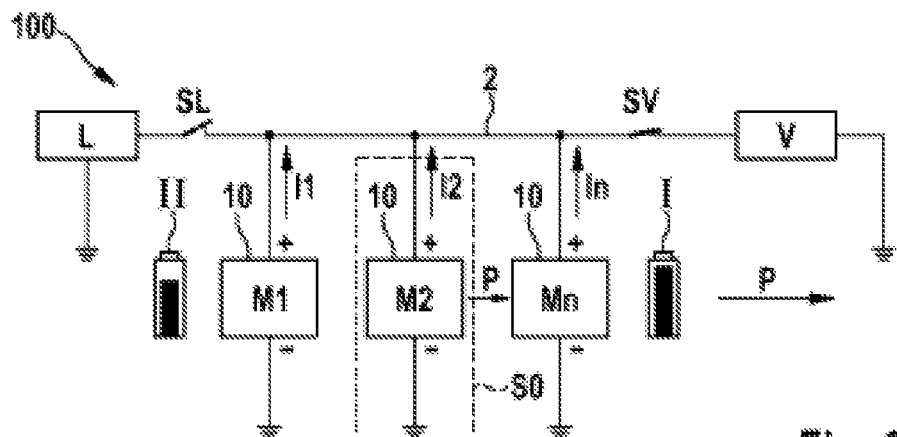
FIG. 6 shows a schematic circuit diagram regarding the balancing of electrochemical storage modules connected in parallel in a different operating state.

FIG. 6 shows the circuit 100 illustrated in FIG. 3 in a balancing method during the discharging. In other words, the charger L has been disconnected from the modules 10 by the opening of the charging contactor SL while the load V is connected to the modules 10 via the busbar 2 by virtue of a closed load contactor SV. The states of charges I, II correspond to the relationships discussed in association with FIGS. 4 and 5 for the sake of comparability. With an identical SOC of all the modules 10, it is desirable for the discharge currents I1, I2, In for all the modules 10 to be identical. However, if different SOCs (different states of charge I, II) are present, then it is desirable for those modules 10 having a higher SOC to be discharged to a greater extent, and modules having a lower SOC to be discharged to a lesser extent. In FIG. 6, I1 less than In would have to prevail for this purpose. Since the modules 10 are in the current source mode anyway, such a regulation can be carried out in a simple manner. The regulated variable for the current intensity is the respective SOC of the modules 10. The charger L is not involved in the balancing as a result of a charging contactor SL having been opened, such that a pure discharging process is illustrated.

Figure 7:
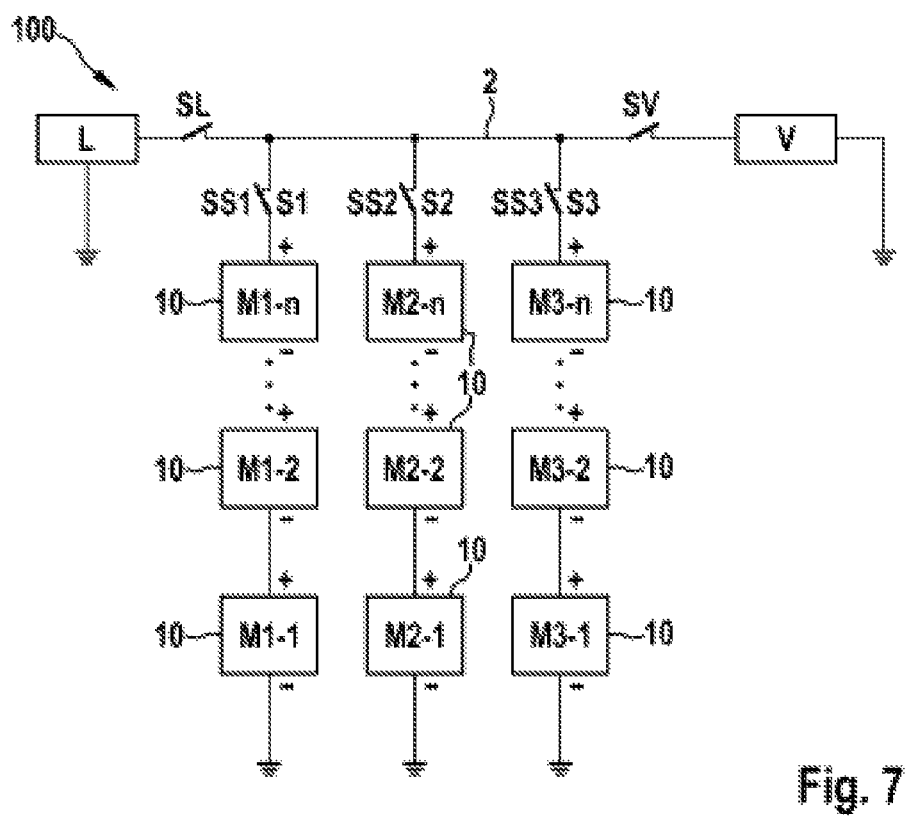
FIG. 7 shows a schematic circuit diagram regarding the operation of parallel strings of electrochemical storage modules.

FIG. 7 shows the circuit 100 illustrated in FIG. 3 for the case where the modules 10 have been supplemented by further modules respectively connected in series (specifically identified by M1-1 to M3-$n$). The modules M1-$x$ form a first string S1. The modules M2-$x$ form a second string S2. The modules M3-$x$ form a third string S3. It goes without saying that further parallel strings may be provided in reality.

Figure 8:
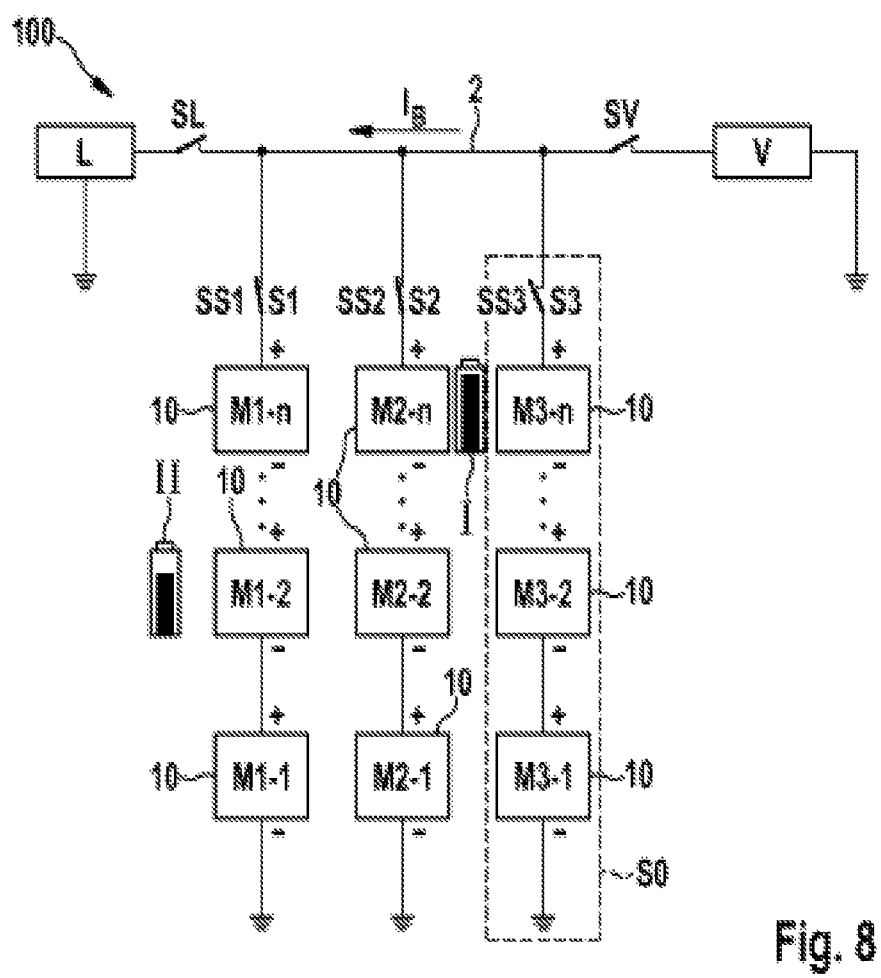
FIG. 8 shows a schematic circuit diagram regarding the balancing of parallel-connected strings of electrochemical storage modules in a first operating state.

FIG. 8 shows the energy store 100 illustrated in FIG. 7 during balancing at a standstill (without charging). This is the state in which the machine or the application (for example a vehicle or an automobile as load V) which is driven by the electrochemical energy store 100 illustrated is deactivated, without involvement of the charger L, for example by the charging contactor SL and the load contactor SV being opened. In the simplest type of embodiment, only two modules 10 in different strings S1, S2, S3 interact with one another. It is assumed in FIG. 8, for example, that the module M1-2 has a lower SOC II than the module M2-$n$ (which has a higher SOC I). Firstly, the string contactors SS1 and SS2 are closed, and unaffected modules M3-1 to M3-$n$ are put into the bypass mode e.g. by virtue of the closing of the string contactor SS3. In order to balance the SOCs I, II, the balancing current $I_B$ must flow from the module M2-$n$ in the direction of the module M1-2. Consequently, either the module M1-2 may be switched as a voltage source and the module M2-$n$ as a current source, or vice versa. In both cases, a plurality of combinations of operating states from the group "regulated", "unregulated", "buck", "boost" are possible. By way of example, when the module M1-2 is operated as a voltage source, the module M1-2 may be unregulated. The module M2-$n$ must then operate in the boost current source mode since its voltage must indeed be higher than the terminal voltage of the module M1-2. Alternatively, it is also possible for the module M1-2 to operate in the buck charging mode (wherein the voltage present is lower than the electrical voltage of the storage cell 1 of the module M1-2), and the module M2-$n$ to operate in the current source mode, etc. The method that generates the least loss will be used in practice. Unaffected modules 10 are put into the bypass mode, in which they permit a current flow through the respective string without impediment. If more than two modules 10, for example three (or more) modules 10, are intended to interact, then it is assumed that the module 10 having the highest SOC operates as a current source, while the modules 10 to be charged operate in the voltage source mode. The module 10 having a higher SOC must be situated in a different string than the two modules 10 having a weaker SOC, which must be situated in series in the same string S1, S2, S3. If the modules 10 to be balanced with regard to their state of charges are situated in the same string S1, S2, S3, for example the module M1-2 having a lower SOC II and the module M1-$n$ having a higher SOC I, a direct balancing between the affected modules is not possible. Firstly, a module 10 in an adjacent string S1, S2, S3 must be used as a charge source for the weaker module M1-2, for example the module M3-1. Afterward, the module M3-1 can then be charged again by the stronger module M1-$n$. By means of this intermediate step, it is possible to balance two arbitrary modules 10 even in the same string S1, S2, S3 with regard to their state of charge SOC. Internal balancing within a module 10 generally takes place by means of the resistive method. This means that the state of charge SOC of cells 1 having a high SOC are brought to the state of cells 1 having a lower SOC by resistive loading. This process takes place periodically as soon as the vehicle is at a standstill or the load V as well as the charger L are not connected to the modules 10. Consequently, the SOC of modules 10 also varies over time even if they are not included in the above balancing method. An iterative module balancing taking account of all modules 10 according to the manner described above is necessary for this reason.

Figure 9:
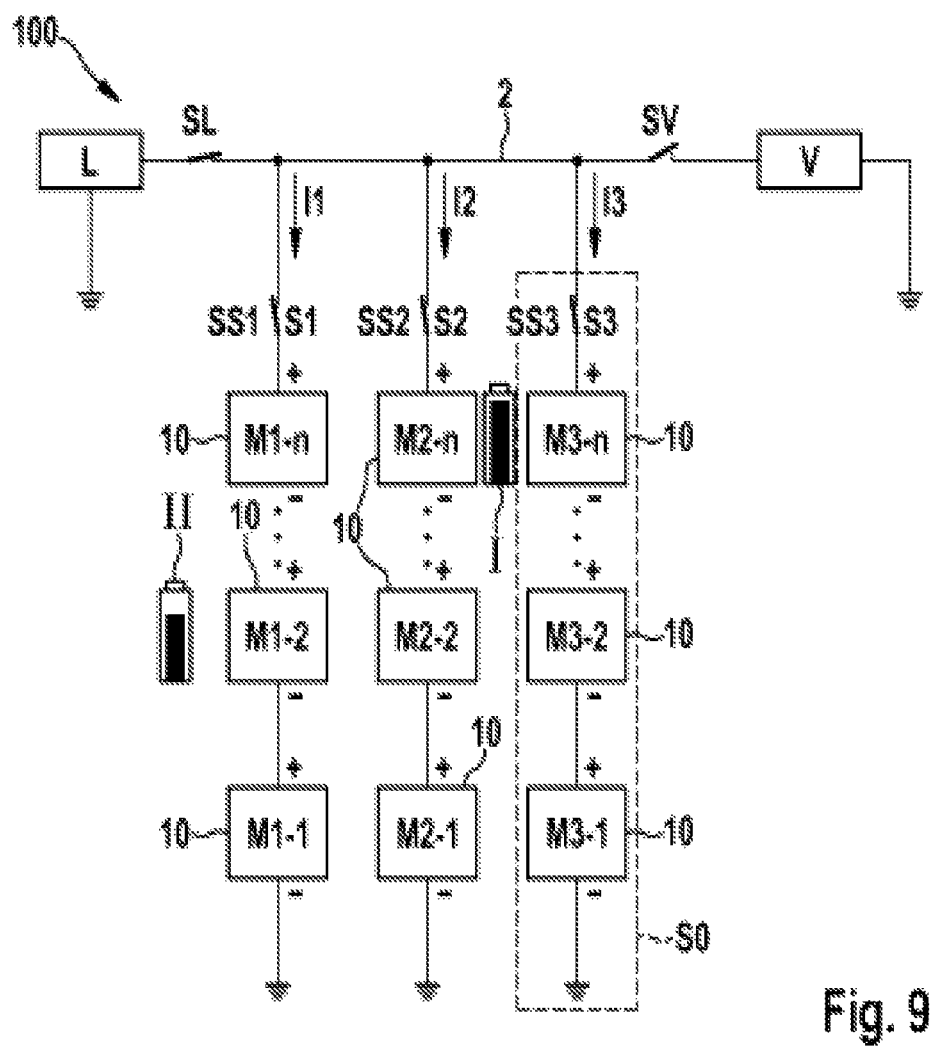
FIG. 9 shows a schematic circuit diagram regarding the balancing of parallel-connected strings of electrochemical storage modules in a second operating state.

FIG. 9 shows the circuit 100 presented in association with FIG. 7 during a balancing in the course of a charging process. By way of example, the module M1-2 is assumed to have a lower SOC II than the module M2-$n$ (which has a higher SOC I). The charger L is assumed to act as a voltage source and the charging current regulation of the strings S1, S2 is controlled such that the charging current I1 in the first string S1 is somewhat higher than the charging current I2 in the second string S2. Both modules M1-2, M2-$n$ are intended to be fully charged in the same time in this way. Strings S1 having a lower SOC II are charged to a greater extent than strings S2 having a higher SOC I. Modules 10 in which the storage cell 1 (e.g. a rechargeable battery) has attained the maximum voltage are put into the bypass mode. In the latter, a current I3 may be routed past the modules M3-1 to M3-$n$ without being impeded. If the last module 10 of a string is fully charged, all the modules 10 are brought to the blocking mode or the corresponding string contactor SS1, SS2, SS3 is opened.

Figure 10:
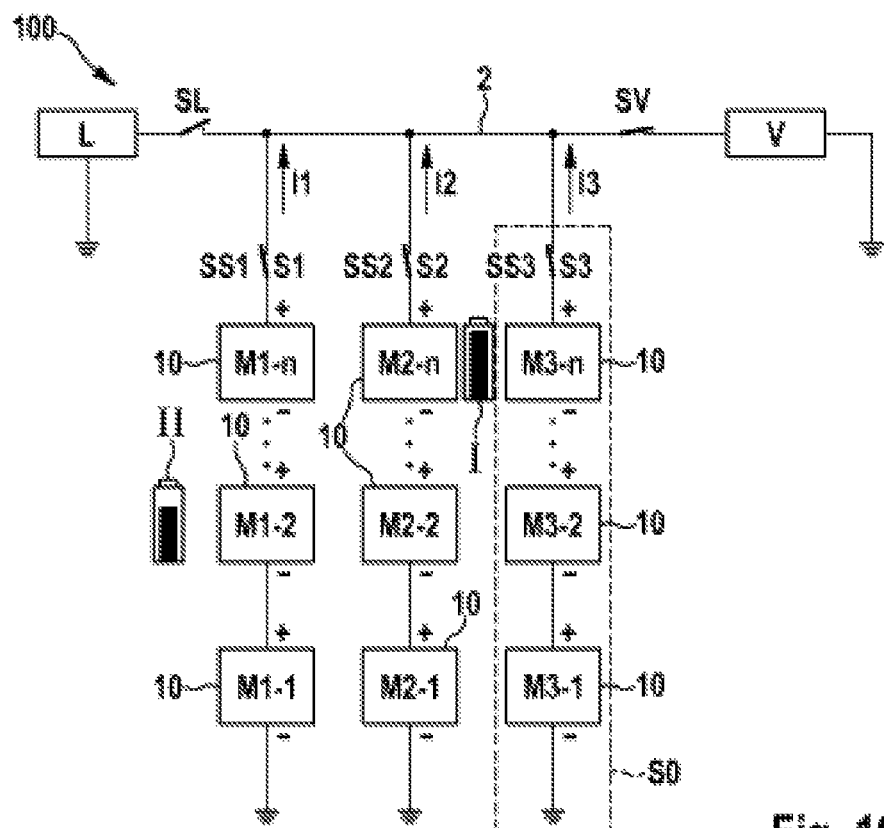
FIG. 10 shows a schematic circuit diagram regarding the balancing of parallel-connected strings of electrochemical storage modules in a third operating state.

FIG. 10 shows the circuit 100 presented in FIG. 7 during a balancing in the course of discharging. Given an identical SOC of all the strings S1, S2, S3, it is desirable for the discharge currents I1, I2, I3 of all the strings S1, S2, S3 to be identical. However, if different SOCs I, II are present, as is illustrated in FIG. 10, then it is desirable for a string S2 having a higher average SOC I to be discharged to a greater extent and a string S1 having a lower average SOC II to be discharged to a lesser extent. In FIG. 10, it would then be the case that I1<I2. Since the strings S1, S2, S3 are in the current source mode anyway in the course of discharging, such a regulation can be carried out in a simple manner. In this case, the regulated variable is the average SOC of the strings S1, S2, S3. If permitted by the power requirements of the load V, weak modules M1-2 may temporarily be put completely into the bypass mode. The role of the weak module M1-2 may then be taken on by a module having a higher SOC in the boost mode in the same string S1. Module balancing within a string S1, S2, S3 may take place as a result of this mechanism.

Figure 11:
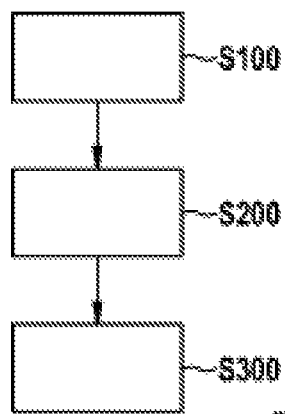
FIG. 11 shows a flow diagram illustrating steps of one exemplary embodiment of a method according to the invention.

FIG. 11 shows a flow diagram illustrating steps of one exemplary embodiment of a method according to the invention. In step S100, a first state of charge of a first storage module 10 is identified. In step S200, a second state of charge of a second storage module 10 is identified. The second storage module 10 is a UniBB module. The latter is operated as a current source in step S300 in order to adapt the first state of charge SOC I and the second state of charge SOC II to one another. In other words, a balancing between the first storage module 10 and the second storage module 10 is carried out by the operation of the UniBB module as a current source.

Even though the aspects and advantageous embodiments according to the invention have been described in detail on the basis of the exemplary embodiments explained in association with the companying figures of the drawings, modifications and combinations of features of the exemplary embodiments illustrated are possible for the person skilled in the art, without departing from the scope of the present invention, the scope of protection of which is defined by the appended claims.

The invention claimed is:

1. A method for balancing a multiplicity of strings of electrochemical storage modules (10) connected in parallel with one another by means of at least one universal buck-boost (UniBB) module and connected by a loading contactor to a load and by a charging contactor to a charger, the method comprising:
identifying (S100) a first state of charge (I) of a first storage module (M1) in a first string of the multiplicity of strings,
identifying (S200) a second state of charge (II) of a second storage module (M2) in a second string of the multiplicity of strings, wherein the second storage module (M2) is a UniBB module,
disconnecting the multiplicity of strings of electrochemical storage modules from the load and the charger, and
operating the first storage module (M1) as a voltage source while the second storage module (M2) is operated as a current source to balance the first state of charge (I) and the second state of charge (II),
wherein the electrochemical storage modules (M1, M2, Mn) further include
(a) electrochemical storage modules which are put into a blocking mode if they belong to strings (S0) not involved in balancing the multiplicity of strings of electrochemical storage modules (10),
(b) electrochemical storage modules which are put into a bypass mode if they belong to strings (S1, S3) involved in balancing the multiplicity of strings of electrochemical storage modules (10), or
both (a) and (b).

2. The method as claimed in claim 1, wherein the first storage module (M1) is also a UniBB module (M).

3. The method as claimed in claim 1, wherein the second state of charge (II) is lower than the first state of charge (I).

4. The method as claimed in claim 1, wherein
the first storage module (M1) is operated in a first operating mode selected from the group consisting of "regulated", "unregulated", "buck", and "boost", and
the second storage module (M2) is operated in a second operating mode selected from the group consisting of "regulated", "unregulated", "buck", and "boost".

5. The method as claimed in claim 1, wherein the first storage module (M1) is operated unregulated and the second storage module (M2) is operated in a boost current source operating mode, or the first storage module (M1) is operated in a buck charging mode and the second storage module (M2) is operated in a current source mode.

6. The method as claimed in claim 1, wherein
if one storage module (M1, M2, Mn) is contained per string (S1, S2, S3), a storage module (M1, M2, Mn) having a highest state of charge is operated as a voltage source and other electrochemical storage modules not put into the blocking mode are operated in a current source mode, and
if more than one storage module (M1, M2, Mn) is contained per string (S1, S2, S3), a storage module (M1, M2, Mn) having a highest state of charge is operated in a current source mode and other electrochemical storage modules not put into the blocking mode or bypass mode are operated in a voltage source mode.

7. The method as claimed in claim 1, wherein when a multiplicity of strings of electrochemical storage modules (10) are connected by the charging contactor to the charger, a charging current impressed into the electrochemical storage modules (10) is controlled depending on a respective state of charge of the storage modules (10) such that a predefined state of charge of the storage modules is substantially attained at an identical point in time.

8. The method as claimed in claim 1, wherein electrochemical storage modules (10) which have attained a predefined maximum voltage are put into the blocking mode.

9. The method as claimed in claim 1, wherein when a multiplicity of strings of electrochemical storage modules (10) are connected by the loading contactor to the load, the strings (S1, S2, S3), depending on their respective average state of charge, are involved in a total current to be supplied of the electrochemical storage modules (10) in order to assume a substantially identical state of charge.

10. An electrochemical energy store (100) comprising
a multiplicity of strings (S1, S2, S3) of electrochemical storage modules (M1, M2, Mn) connected in parallel with one another, and
a processing unit, wherein the processing unit is designed to carry out a method as claimed in claim 1.

* * * * *